(12) United States Patent
Seok et al.

(10) Patent No.: US 11,963,100 B2
(45) Date of Patent: Apr. 16, 2024

(54) METHOD AND APPARATUS FOR MULTI-BAND POWER MANAGEMENT IN A WIRELESS NETWORK

(71) Applicant: MediaTek Singapore Pte. Ltd., Solaris (SG)

(72) Inventors: Yongho Seok, San Jose, CA (US);
Jianhan Liu, San Jose, CA (US);
Bajko Gabor, San Jose, CA (US);
James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/596,192

(22) Filed: Oct. 8, 2019

(65) Prior Publication Data

US 2020/0120603 A1    Apr. 16, 2020

Related U.S. Application Data

(60) Provisional application No. 62/892,586, filed on Aug. 28, 2019, provisional application No. 62/754,004, filed on Nov. 1, 2018, provisional application No. 62/744,684, filed on Oct. 12, 2018.

(51) Int. Cl.
*H04W 52/02* (2009.01)
*H04W 84/12* (2009.01)

(52) U.S. Cl.
CPC ........ *H04W 52/0222* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0177712 A1* | 7/2010 | Kneckt | H04W 76/14 |
| | | | 370/329 |
| 2016/0198350 A1* | 7/2016 | Lou | H04B 17/345 |
| | | | 370/252 |
| 2016/0353470 A1* | 12/2016 | Liu | H04W 72/121 |
| 2018/0054847 A1* | 2/2018 | Cariou | H04W 28/0861 |
| 2018/0092039 A1* | 3/2018 | Cariou | H04W 52/0235 |
| 2018/0160370 A1* | 6/2018 | Alpert | H04W 52/0225 |
| 2019/0082373 A1* | 3/2019 | Patil | H04L 1/1614 |
| 2019/0123938 A1* | 4/2019 | Min | H04B 7/0408 |

(Continued)

FOREIGN PATENT DOCUMENTS

| | | |
|---|---|---|
| WO | 2010068066 A2 | 6/2010 |
| WO | 2010068066 A3 | 6/2010 |

*Primary Examiner* — Srinivasa R Reddivalam

(57) ABSTRACT

Power management operations are performed by devices communicating using multiple bands simultaneously where a first wireless band can be used to send and receive power management control frames for use on a second wireless band of a wireless network. In this way, a device that is in a sleep or dose power management state on a first band can be instructed to enter an awake power management state on the first band based on a communication received over a second band that is currently active and receiving data. Embodiments of the present invention enable power to be conserved when a band is not currently being used, or when there is no more data available (buffered) for a specific band.

10 Claims, 13 Drawing Sheets

(56) References Cited

U.S. PATENT DOCUMENTS

2020/0045634 A1* 2/2020 Kneckt .............. H04W 40/244
2020/0107393 A1* 4/2020 Chu .................... H04L 1/0003
2021/0360522 A1* 11/2021 Chitrakar .......... H04W 52/0206

* cited by examiner

US 11,963,100 B2

METHOD AND APPARATUS FOR MULTI-BAND POWER MANAGEMENT IN A WIRELESS NETWORK

CROSS-REFERENCE TO RELATED APPLICATIONS

This application claims the benefit of and priority to provisional patent application Ser. No. 62/744,684, with filing date Oct. 12, 2018, and provisional patent application Ser. No. 62/754,004, with filing date Nov. 1, 2018. These applications are hereby incorporated by reference in their entirety.

FIELD

Embodiments of the present invention generally relate to the field of wireless communications. More specifically, embodiments of the present invention relate to systems and methods for controlling wireless devices to efficiently manage power when communicating using multi-band communication in a wireless network.

BACKGROUND

Modern electronic devices typically send and receive data with other electronic devices wirelessly using Wi-Fi, and many of these devices are "dual band" devices that include at least two wireless transceivers capable of operating in different frequency bands e.g., 2.4 GHz and 5 GHz. In most cases, a wireless device will communicate over only a single band at a time. For example, older and low-power devices e.g., battery powered devices, often operate on the 2.4 GHz band. Newer devices and devices that require greater bandwidth often operate on the 5 GHz band.

However, in some cases, the use of a single band may not satisfy the bandwidth needs of certain devices. Therefore, some developing approaches to wireless communication increase communication bandwidth by operating on multiple bands concurrently, and can control which wireless device or devices can use the multiple bands, for example, based on current network traffic. What is needed is an approach to wireless power management that can utilize multiple bands concurrently to manage the power of wireless devices in a wireless network.

SUMMARY

Accordingly, embodiments of the present invention provide a method and apparatus for wireless power management that can utilize multiple bands concurrently to manage the power of wireless devices.

According to one embodiment, a method of managing a power state of a wireless station (STA) for cooperative multi-band operation between the STA and a wireless access point (AP) for a wireless network is disclosed. The method includes transmitting a frame from the STA to the AP over a first band, where the STA and the AP are in wireless communication using the first band and a second band, the frame including a multi-band control subfield including a band indication of the second band. The method further includes updating a power management mode of the STA for the second band.

According to some embodiments, the frame comprises a CAS control subfield including a service period status subfield and a power management mode, and where the updating a power management mode of the STA for the second band includes updating a service period status of the STA for the second band according to the service period status subfield of the CAS control subfield.

According to some embodiments, the first band and the second band respectively include at least one of: a 2.4 GHz band; a 5 GHz band; and a 6 GHz band.

According to some embodiments, the method includes accessing a traffic indication map (TIM) for the first band and the second band based on a respective traffic type associated with the first band and the second band.

According to some embodiments, the method includes determining a buffer status of the first band and the second band according to the TIM.

According to some embodiments, the TIM includes a virtual bitmap of association IDs mapped to the first band and the second band based on traffic type.

According to a different embodiment, a method of managing a power state of a wireless station (STA) for cooperative multi-band operation between the STA and a wireless access point (AP) for a wireless network is disclosed. The method includes transmitting a QoS Null frame from the STA to the AP using a first band, where the STA and the AP are in wireless communication using the first band and a second band, and where the QoS Null frame triggers a service period (SP) for the first band and the second band, updating a power management mode of the STA for the second band according to a first EOSP subfield of the QoS Null frame, where the second band is identified by a band information subfield of the QoS Null frame, and updating a power management mode of the STA for the first band according to a second EOSP subfield of the QoS Null frame.

According to some embodiments, the first EOSP subfield and the band information subfield are included in an A-Control field of the QoS Null frame.

According to some embodiments, the second EOSP subfield is included in a QoS Control field of the QoS Null frame.

According to some embodiments, the method includes receiving a QoS Data frame from the AP at the STA using the second band, updating a power management mode of the STA for the second band according to a first EOSP subfield of the QoS Data frame, and updating a power management mode of the STA for the first band according to a second EOSP subfield of the QoS Data frame, where the first band is indicated by a band information subfield of the QoS Data frame.

According to some embodiments, the second EOSP subfield and the band information subfield are included in an A-Control field of the QoS Data frame, and where the first EOSP subfield is included in a QoS Control field of the QoS Data frame.

According to some embodiments, the QoS Data frame includes a first More Data (MD) subfield indicating additional data is buffered on the first band, and a second MD subfield indicating additional data is buffered on the second band.

According to some embodiments, the power management mode of the STA is updated for the first band where the STA is in an awake mode on the first band when more data is available on the first band, and the power management mode of the STA is updated for the first band where the STA is in a doze mode on the first band when no more data is available on the first band.

According to another embodiment, a dual-band device for performing cooperative multi-band operation with a wireless access point (AP) for a wireless network is disclosed. The device includes a first transceiver configured to communicate over a first wireless band, a second transceiver configured to communicate over a second wireless band, where the first transceiver and the second transceiver are operable to communicate simultaneously, a cooperative management unit configured to exchange data with the first transceiver and the second transceiver for managing simultaneous communication of the first transceiver and the second transceiver, and a processor operable to cause to be transmitted a frame from the device to the AP over the first wireless band, where the device and the AP are in wireless communication using the first wireless band and the wireless second wireless band. The frame includes a multi-band control subfield including a band indication of the second wireless band, and a Command and Status (CAS) control subfield including a power management mode for the second wireless band. The processor is further operable to update a power management mode of the device for the second wireless band according to the power management mode of the CAS control subfield.

According to some embodiments, the CAS control subfield further includes a service period status subfield, and where the update a power management mode of the device for the second wireless band includes updating a service period status of the device for the second wireless band according to the service period status subfield of the CAS control subfield.

According to some embodiments, where the first wireless band and the second wireless band individually include at least one of a 2.4 GHz band, a 5 GHz band, and a 6 GHz band.

According to some embodiments, the processor is further operable to access a traffic indication map (TIM) for the first wireless band and the second wireless band based on a respective traffic type associated with the first wireless band and the second wireless band.

According to some embodiments, the processor is further operable to determine a buffer status of the first wireless band and the second wireless band according to the TIM.

According to some embodiments, the multi-band control subfield includes a control ID subfield has a value of 5 to indicate that the CAS control subfield is applied on the second wireless band indicated by the band information.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
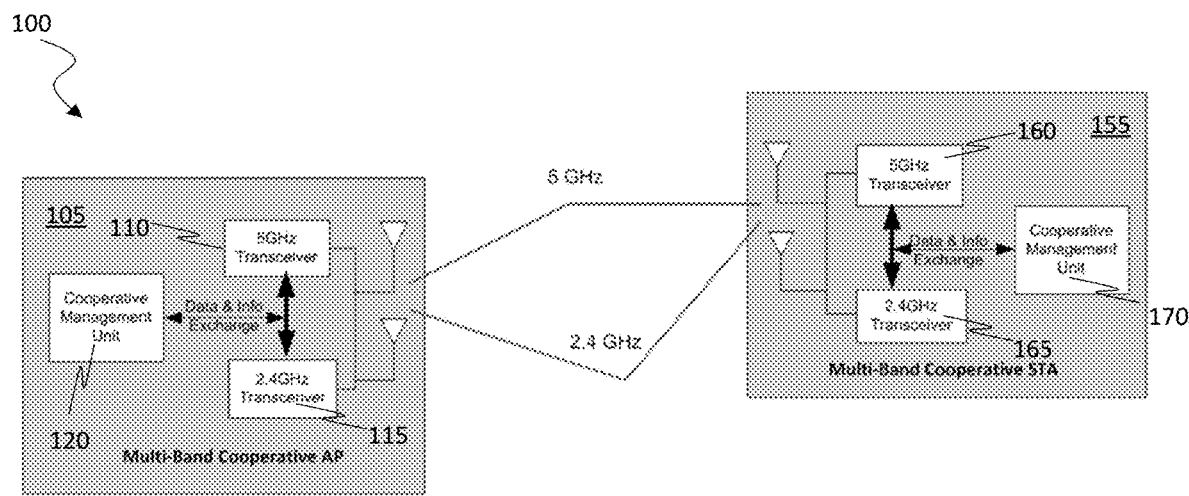
FIG. 1 is a block diagram of an exemplary wireless communication system or network including a multi-band cooperative AP and a multi-band cooperative STA depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 11A and 11B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Multi-Band Power Management in a Wireless Network

Embodiments of the present invention provide a method and apparatus for simultaneous transmission and reception of data wirelessly using different wireless bands. The multi-link operations described herein can provide higher network throughput and improved network flexibility compared to traditional techniques to wireless communication. Power management operations are performed by devices communicating using multiple bands simultaneously where a first wireless band can be used to send and receive power management control frames for use on a second wireless band. In this way, a device that is in a sleep or dose power management state on a first band can be instructed to enter a awake power management state on the first band based on a communication received over a second band that is currently active and receiving data. Embodiments of the present invention enable power to be conserved when a band is not currently being used, or when there is no more data available (buffered) for a specific band.

As used herein, the term "EHT" may refer to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

With regard to FIG. 1, an exemplary wireless communication system 100 including a multi-band cooperative AP 105 and a multi-band cooperative STA 155 are depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

The multi-band cooperative ST 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively.

The multi-band cooperative AP 105 and the multi-band cooperative STA 155 have simultaneous transmission and reception capability for communicating using different wireless bands. The transmitters operating on the different bands can perform independent clear channel assessments (CCAs) using joint or intendent transmissions. Moreover, full duplex communication can be enabled by independent multi-band operation using FDD mode.

The STA 155 can access channels in multiple bands independently. For example, after receiving an enhanced distributed channel access (EDCA) transmission opportunity (TXOP) frame, the STA 155 can begin transmitting frames over the respective band during the window of time provided in the EDCA TXOP frame. When the STA 155 receives EDCA TXOP frames in multiple bands simultaneously, the STA 155 can transmit frames using multiple bands simultaneously during the provided window of time.

The STA 155 transmitting frames using multiple bands simultaneously can mitigate delay and improve peak throughput of the STA 155. However, in some cases, transmitting frames using multiple bands simultaneously can degrade the performance of the basic service set (BSS) comprising the STA 155. For example, the performance of the BSS can be degraded when the STA 155 operating on multiple bands simultaneously uses a substantial amount of the bandwidth available to the BSS due to the increased traffic. Therefore, the AP 105 can control which STAs are granted multi-band channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide buffer status information for each links. Depending the Quality of Service (QoS)

policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide buffer status information for both links to the STA, where some data can only be sent on the first link, and other data can only be sent on the second link.

Figure 2:
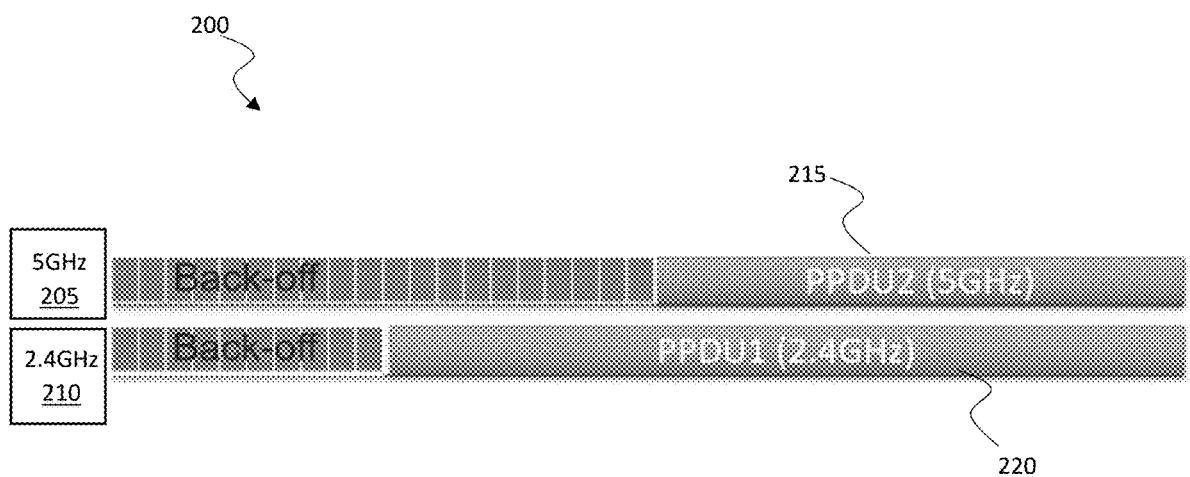
FIG. 2 is a block diagram of an exemplary multi-band wireless transmission between wireless communication devices using a 5 GHz band and a 2.4 GHz band according to embodiments of the present invention.

FIG. 2 depicts an exemplary multi-band wireless transmission diagram 200 between wireless communication devices using a 5 GHz band 205 and a 2.4 GHz band 210 according to embodiments of the present invention. A TXOP frame is received by an STA performing channel access operations in multiple bands independently. After obtaining the TXOP frame, the STA transmits frames over multiple bands. For example, when the STA obtains TXOPs in bands 205 and 210, the STA can transmit frames in bands 210 and 220 simultaneously.

Instead of transmitting an individual ACK for every frame, multiple frames can be acknowledged together using a single Block Ack (BA) frame. A BA typically contains a bitmap size of 64*16 bits. These 16 bits indicate the fragment number of the frame to be acknowledged. Each bit of this bitmap represents the status (success/failure) of a frame. To perform cooperative multi-band operations, an AP and STA establish cooperative multi-band operations for sending frames 215 and 220 using the multiple bands. If the frames are under a block ack agreement, an ADDBA Request frame may be transmitted and includes multiple multi-band information elements for indicating the bands on which an STA can send frames of the TID as indicated in the ADDBA Request frame.

When an STA that is transmitting frames using one or more bands schedules a new frame transmission using a different band than the bands currently used by the STA, and the current frame is under a block ack agreement, the STA may use the same TID for the scheduled frame only if the reordering buffer for the TID of the current frame is available. Otherwise, the STA chooses a TID for the scheduled frame that is different than the TID of the current frame.

When the current frame is not under a block acknowledgement, the STA may choose the scheduled frame from the same TID with the ongoing frame only if the ongoing frame has no more retries (including a frame having the Ack Policy field set to No Ack) and the transmission end time of the scheduled frame is not earlier than the transmission end time of the current frame. Otherwise, the STA may choose the scheduled frame from a TID that is different than the TID of the current frame. Scheduling the frame from a TID that is different from the TID of the current frame simplifies the transmission protocol, but the performance of the cooperative multi-band operation may be reduced.

Figure 3:
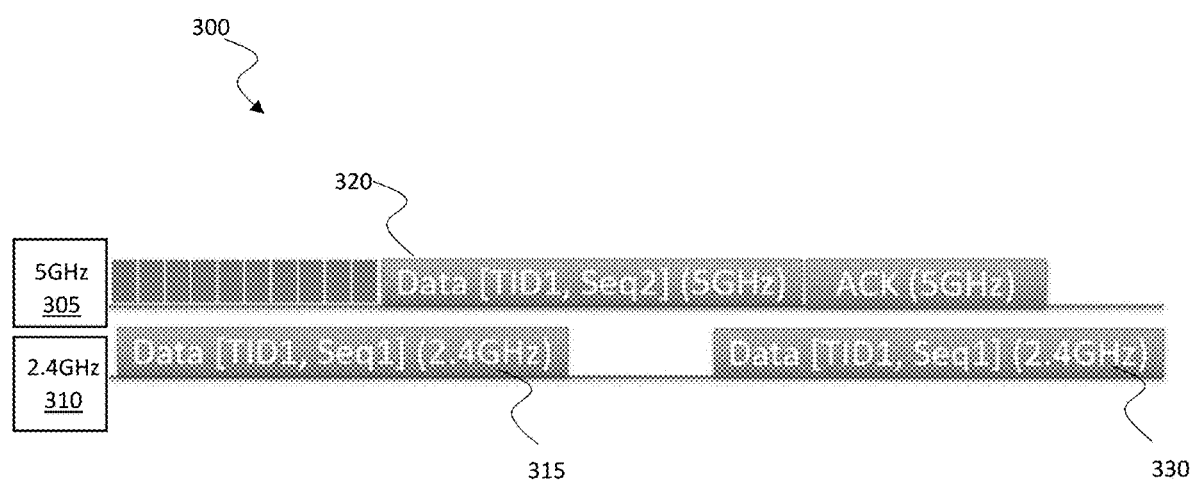
FIG. 3 is a block diagram depicting an exemplary multi-band wireless transmission between wireless communication devices for establishing cooperative multi-band operation according to embodiments of the present invention.

FIG. 3 depicts an exemplary multi-band wireless transmission diagram 300 between wireless communication devices for establishing cooperative multi-band operation according to embodiments of the present invention. When the current frame is not under a block ack agreement, an STA can transmit data frames Seq1 315 and Seq2 320 from TID1 on 2.4 GHz band 310 and 5 GHz band 305 simultaneously. If the data frame of Seq1 315 transmitted on 2.4 GHz band 310 fails, the STA retransmits the data frame of Seq1 330. The recipient STA delivers the data frame of Seq2 320 to an upper layer and then delivers the retransmitted data frame of Seq1 330 to an upper layer.

Figure 4:
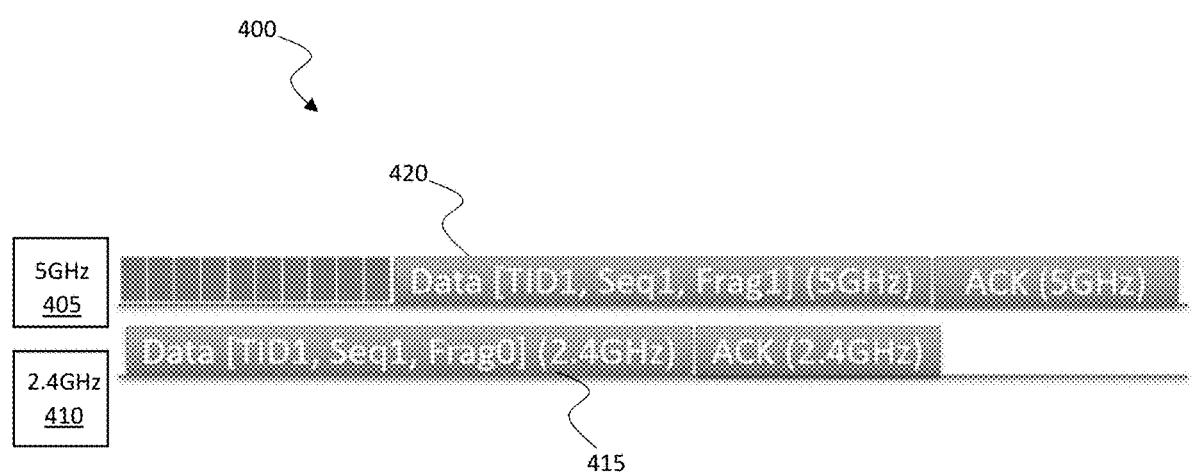
FIG. 4 is a flowchart depicting an exemplary multi-band wireless transmission between wireless communication devices for performing cooperative multi-band operations using fragmented frames according to embodiments of the present invention.

FIG. 4 depicts an exemplary multi-band wireless transmission diagram 400 between wireless communication devices for establishing cooperative multi-band operation using fragmented frames according to embodiments of the present invention. Scheduled frames 415 and 420 are transmitted on 2.4 GHz band 410 and 5 GHz band 405 simultaneously. When the current frame is a fragmented frame, the STA may choose the scheduled frames 415 and 420 from the remaining fragmented frames.

When a non-AP STA receives a Trigger frame from an AP in a first wireless band (e.g., 5 GHz), the non-AP STA can calculate the path loss from the received signal strength index (RSSI) and the AP Tx Power of the Common Info field of the Trigger frame. The downlink (DL) path loss information is used for performing channel access and determining the rate selection of the frame transmitted from the non-AP STA to the AP in a second band. When the back-off timer for the channel access in the second band is expired, the non-AP STA does not initiate a frame transmission to the AP if the non-AP STA determines that the minimum receiver sensitivity on the AP is not met.

A non-AP STA can also change the operating mode of the second wireless band based on the DL path loss information. For example, the non-AP STA can reduce the Rx Channel Width and Rx Number of Spatial Streams (NSS) in the second band when the DL path loss increases. Alternatively, the non-AP STA can pause a transmission from the AP to the non-AP STA in the second wireless band by entering power save mode in the second wireless band.

A non-AP STA can change the Rx Channel Width and Rx NSS of the second wireless band by sending a frame in the first wireless band. The frame contains the Multi-band Control subfield including band information indicating the second wireless band, and the Control ID is set to "1" to indicate that the OM Control subfield is applied on the second wireless band (the wireless band indicated by the band information). The frame also contains the OM Control subfield representing modified operating parameters for the second wireless band. The AP that received the frame in the first band updates the Rx operating parameters in the second wireless band of the STA.

The non-AP STA can modify the Tx Channel Width and Tx NSS in the second wireless band by sending a frame in the first wireless band. The frame contains the Multi-band Control subfield including band information indicating the second band, and the Control ID is set to "1" to indicate that the OM Control subfield is applied on the second wireless band (the band indicated by the band information). The frame also include an OM Control subfield representing the modified Tx operating parameters for the second band. The AP that receives the frame in the first band updates the Tx operating parameters in the second band of the STA.

The non-AP STA can report the buffer status of the second band by sending a frame in the first wireless band. The frame includes the Multi-band Control subfield containing band information indicating the second wireless band. The Control ID is set to "3" to indicate that the buffer status report (BSR) subfield is applied to the second wireless band (the band indicated by the band information). The frame also includes the BSR Control subfield representing the buffer status of the second band. The AP that received the frame in the first wireless band updates the buffer status in the second wireless band of the STA.

A non-AP STA can report the available channels of the second wireless band by sending a frame in the first wireless band having a Multi-band Control subfield containing band information indicating the second wireless band. The Control ID is set to "5" to indicate that the Bandwidth Query Reports (BQR) subfield is applied to the second wireless band (the band indicated by the band information). The BQR Control subfield represents the available channel bitmap in the second band. If the network allocation vector (NAV) of the STA in the second wireless band indicates that the wireless channel is busy, all values of the available channel bitmap shall be set to "0" indicating that the channels are busy or unavailable. The AP that received the frame in the first wireless band updates the available channels of the second wireless band of the STA.

Figure 5A:
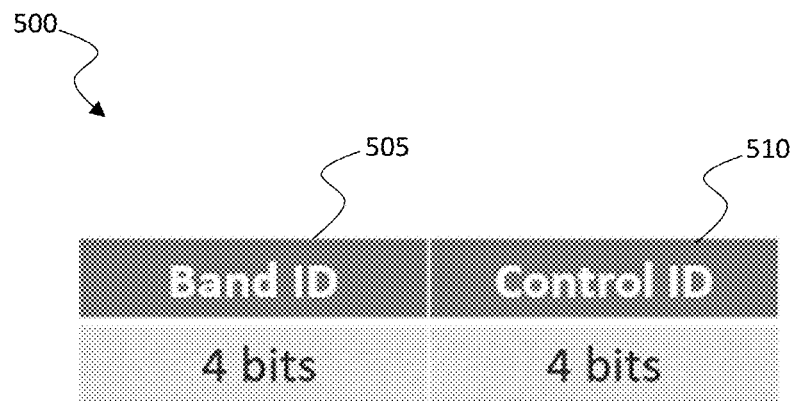
FIGS. 5A is a block diagram depicting an exemplary control field used to indicate which A-Control field is applied to different bands for cooperative multi-band operation according to embodiments of the present invention.
Figure 5B:
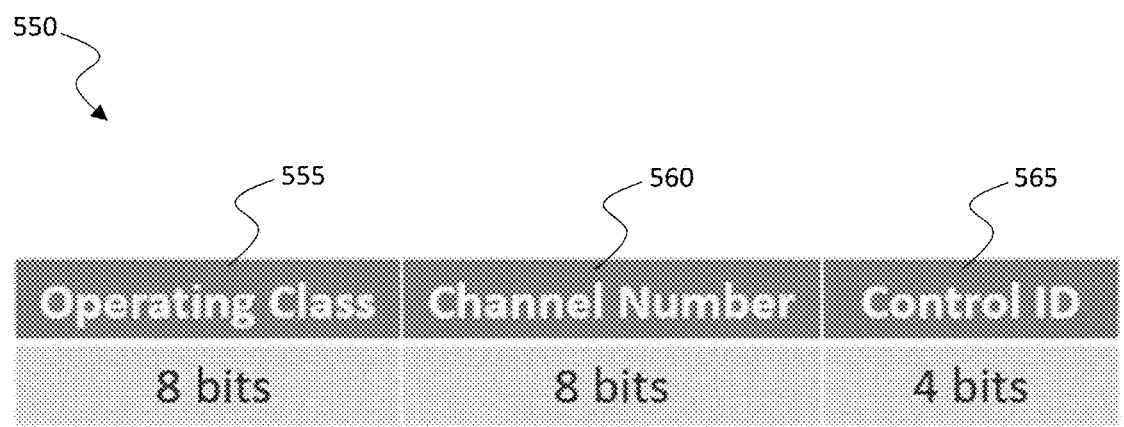
FIGS. 5B is a block diagram depicting a second exemplary control field used to indicate which A-Control field is applied to different bands for cooperative multi-band operation according to embodiments of the present invention.

With regard to FIGS. 5A and 5B, exemplary control fields 500 and 550 are used to indicate which A-Control field is applied to different bands for cooperative multi-band operation according to embodiments of the present invention. If the Control ID subfield in a Control subfield of an A-Control subfield is "7" (indicating Multi-band Control), then the Control Information subfield of the Control subfield contains the band information and the band ID for performing Multi-band Control.

The band information represented by Band ID 505 in a Multi-band Control subfield 500, or by Operating Class 555 and Channel Number 560 in Multi-band Control subfield 550, specify the band on which A-Control field transmitted in the same frame (e.g., a MAC Protocol Data Unit (MPDU)) is applied. The Band ID 505 can be set to 0 (TV white spaces), 1 (Sub-1 GHz excluding TV white spaces), 2 (2.4 GHz), 3 (3.6 GHz), 4 (4.9 and 5 GHz), 5 (60 GHz), 6 (UNII-1), 7 (UNII-2A), 8 (UNII-2B), 9 (UNII-2C), 10 (UNII-3), 11 (UNII-5), 12 (UNII-6), 13 (UNII-7), 14 (UNII-8), and 15 (Reserved) depending on the type of data to be transmitted. The Control ID 510 or 565 specifies which A-Control field is applied on the band that is specified in the band information (e.g., Band ID 505 in control field 500 or Operating Class 555 and Channel Number 560 in control field 550).

Figure 6A:
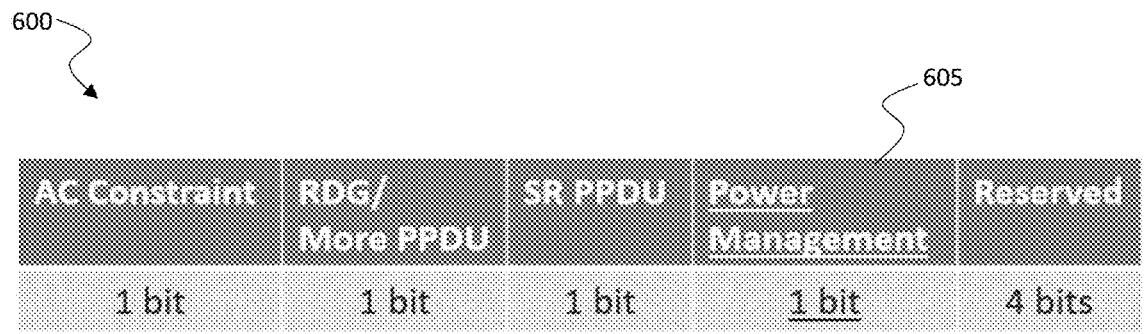
FIG. 6A is a block diagram of an exemplary CAS control subfield provided by a non-AP STA to an AP according to embodiments of the present invention.

FIG. 6A depict an exemplary Command and Status (CAS) control subfields 600 provided by a non-AP STA to an AP according to embodiments of the present invention. The AP that receives the frame in a first band updates the power management mode of the STA in a second band. Specifically, the non-AP STA pauses a transmission from the AP to the non-AP STA in the second band and sends a frame in the first band, where the frame contains a Multi-band Control subfield (e.g., Multi-band Control subfield 500 or 550) having band information indicating the second band, and a Control ID set to "5" to indicate that the CAS subfield 600 is applied on the second band (the band indicated by the band information). The frame includes the CAS Control subfield 600 having a Power Management (PM) field 605 representing the power management mode of the second band of the STA.

Figure 6B:
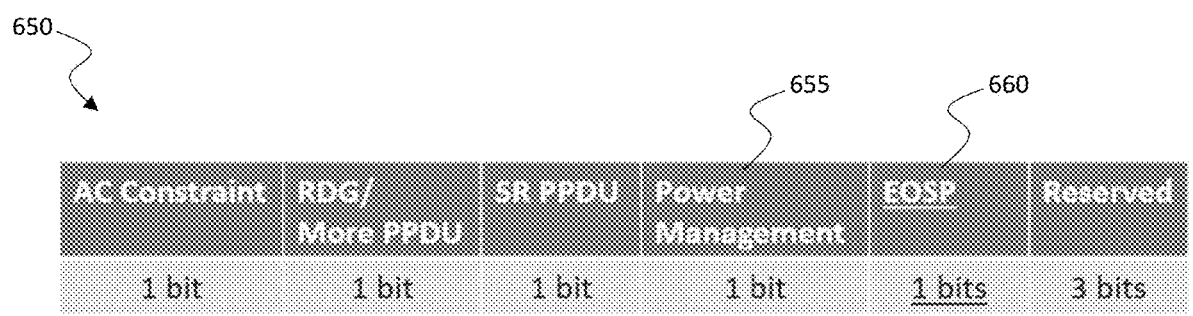
FIG. 6B is a block diagram of a second exemplary CAS control subfield having an EOSP field provided by a non-AP STA to an AP according to embodiments of the present invention.

FIG. 6B depict an exemplary CAS control subfields 650 provided by a non-AP STA to an AP according to embodiments of the present invention. The AP that receives the frame in a first band updates the power management mode of the STA in a second band. Specifically, the non-AP STA triggers a Service Period (SP) in the second band and sends a frame in the first band, where the frame contains a Multi-band Control subfield (e.g., Multi-band Control subfield 500 or 550) having band information indicating the second band, and a Control ID set to "5" to indicate that the CAS subfield is applied on the second band (the band indicated by the band information). The frame includes the CAS Control subfield 650 having a PM field 655 representing the power management mode of the second band of the STA, and an EOSP field 660 representing the Unscheduled Automatic Power Save Delivery (U-APSD) Service Period status of the second band of the STA. The EOSP field for triggering a Service Period (SP) in the second band is set to "0".

With regard still to FIG. 6B, an AP that terminates a Service Period in the second band may send a frame using the first band including a Multi-band Control subfield (e.g., Multi-band Control subfield 500 or 550) having band information indicating a second band, and a Control ID set to "5" to indicate that the CAS subfield 650 is applied on the second band (the band indicated by the band information). The frame includes the CAS Control subfield 650 having an EOSP field 660 representing the U-APSD Service Period status of the second band of the STA. The EOSP field for triggering a Service Period (SP) in the second band is set to "1". The non-AP STA that receives the frame in the first band updates the Service Period status of the STA in the second band.

According to some embodiments, a PM field 655 carried in a Frame Control field can indicate the power management mode of the first band on which the frame is sent, and the PM field in the A-Control field can be used to indicate the power management mode of the second band (the band indicated by the band information in the A-Control field). Similarly, the EOSP field in a QoS Control field can be used to indicate the SP status of the first band on which the frame is sent, and the EOSP field in an A-Control field can indicate the SP status of the second band (the band indicated by the band information in the A-Control field).

Figure 7:
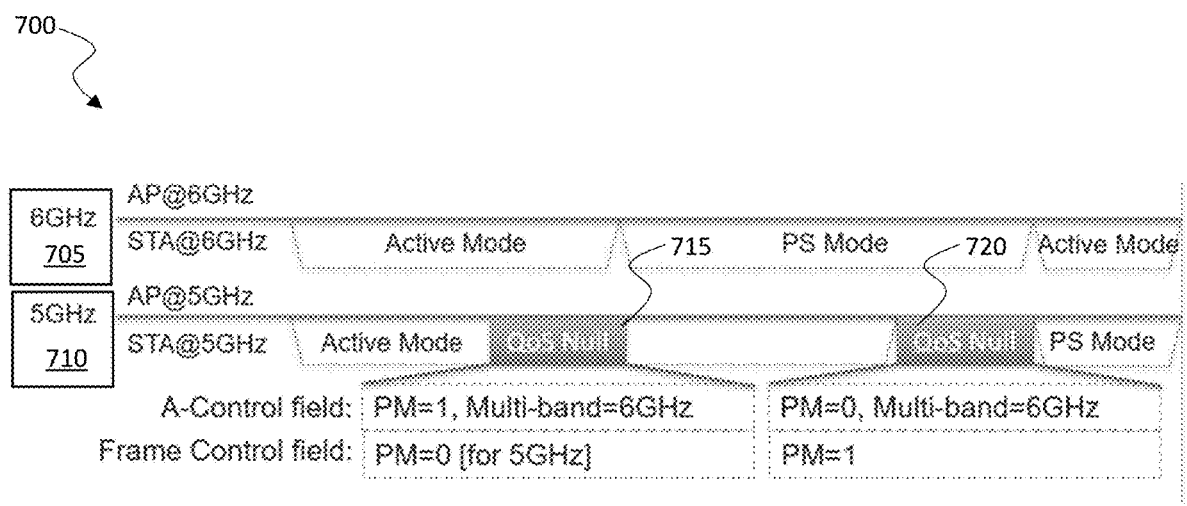
FIG. 7 is an exemplary transmission timing diagram depicting an AP and a non-AP STA operating using cooperative multi-band communication over a 6 GHz band and a 5 GHz band according to embodiments of the present invention.

With regard to FIG. 7, an exemplary transmission timing diagram 700 depicts an AP and a non-AP STA operating using cooperative multi-band communication over a 6 GHz band 705 and a 5 GHz band 710 according to embodiments of the present invention. The STA transitions from an active mode used to transmit and receive data to a passive Power Saving (PS) mode to conserve power. QoS Null frames 715 and 720 are transmitted by the STA over the 5 GHz band 710 to control the PM mode of the STA. QoS Null frame 715 sent over the 5 GHz band 710 by the STA changes the power management mode in the 6 GHz band 705 from the Active mode to the PS mode.

Specifically, as depicted in FIG. 7, the QoS Null frame 715 includes an A-Control field setting the PM mode to 1 for the 6 GHz band 705, and a frame control field setting the PM mode to 0 for the 5 GHz band 710. The QoS Null frame 720 sent in the 5 GHz band 710 by the STA changes the power management mode in the 6 GHz band 705 from the PS mode to the Active mode and changes the power management mode in the 5 GHz band 710 from the Active mode to the PS mode. Specifically, the QoS Null frame 720 includes an A-Control field setting the PM mode to 0 for the 6 GHz band 705, and a Frame Control field setting the PM mode to 1 for the 5 GHz band 710.

Figure 8:
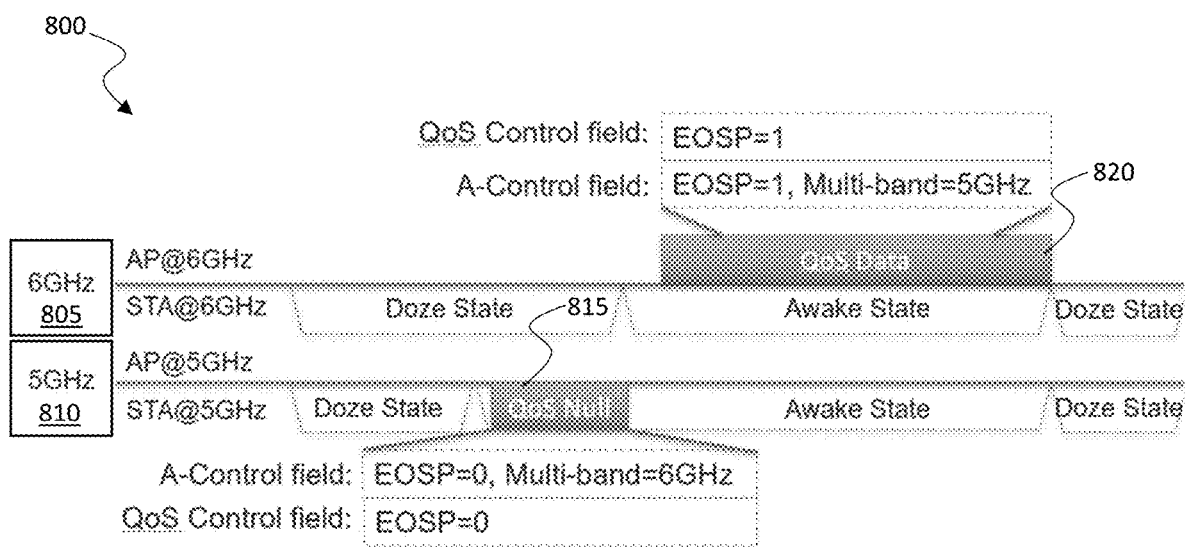
FIG. 8 is an exemplary transmission timing diagram depicting an AP and a non-AP STA operating using cooperative multi-band communication over a 6 GHz band and a 5 GHz band to control the STA awake state according to embodiments of the present invention.

With regard to FIG. 8, an exemplary transmission timing diagram 800 depicting an AP and a non-AP STA operating using cooperative multi-band communication over a 6 GHz band 805 and a 5 GHz band 810 to control the STA awake state according to embodiments of the present invention. QoS Null frame 815 is sent over the 5 GHz band 810 by the STA and triggers the Service Periods in both the 5 GHz band 810 and the 6 GHz band 805. QoS Data frame 820 sent over the 6 GHz band 805 by the AP terminates the Service Periods in both the 5 GHz band 810 and 6 GHz band 805.

Specifically, as depicted in FIG. 8, QoS Null frame 815 includes an A-Control field having an EOSP field indicating that the STA should enter an awake state for the corresponding 6 GHz band 805 indicated by the Multi-band subfield of the A-control field. The QoS Null frame 815 also includes a QoS control field having an EOSP field indicating that the STA should enter an awake state for the corresponding 5 GHz band 810. The QoS Data frame 820 includes a QoS control field having an EOSP field indicating that the STA should enter a doze state for the corresponding 6 GHz band 805. The QoS Data frame 820 also includes an A-Control field having an EOSP field indicating that the STA should enter a doze state for the corresponding 5 GHz band 810 indicated by the Multi-band subfield of the A-control field.

According to embodiments of the present invention, an AP can assign an association ID (AID) to each STA associated with each link of the multi-link operation when frames of a specific traffic type can only be transmitted on an allocated link. A Traffic Indication Map (TIM) IE, such as a traffic indication virtual bitmap bit associated with an AID for each link, can be used to indicate the buffer status of the corresponding links.

Figure 9:
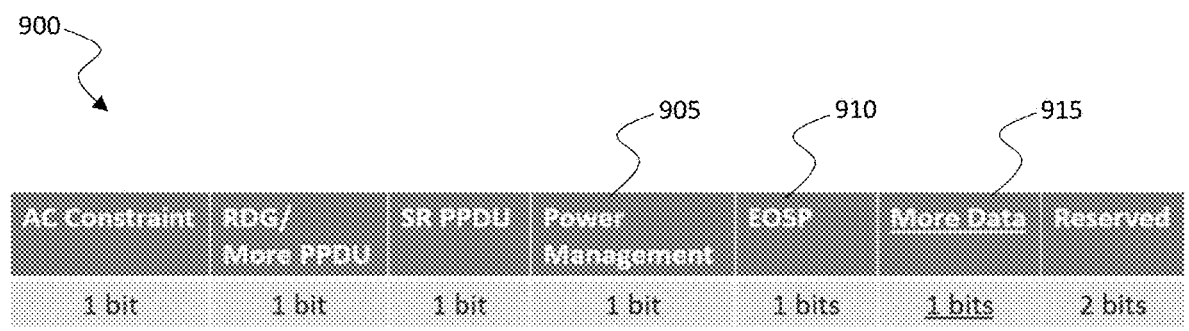
FIG. 9 is a block diagram of an exemplary CAS control subfield having a More Data field provided by a non-AP STA to an AP according to embodiments of the present invention.

Alternatively, instead of assigning AIDs for each STA associated with each link based on traffic type and stored in a TIM, as depicted in FIG. 9, a More Data (MD) field 915 in a Frame Control field 900 corresponding to an individually addressed frame that is sent to the STA indicates the buffer status for the link on which the frame is sent according to embodiments of the present invention. According to some embodiments, the MAC header of the frame has a More Data field (one bit) indicating that there is more data to deliver for out of band signaling. The non-AP STA that received the frame in the first band may initiate the SP of the STA in the second band in order to receive the buffered data over the second band.

Specifically, the AP that provides the buffer status of the second band may send a frame over the first band including a Multi-band Control subfield (e.g., Multi-band Control subfield 500 or 550) and a CAS Control subfield 900. The band information in the Multi-band Control subfield indicates the second band, and the Control ID is set to "5" to indicate that the CAS subfield 900 is applied to the second band (the band indicated by the band information). More Data field 915 of the CAS subfield 900 indicates the buffer status in the second band of the AP. PM field 905 represents the power management mode of the second band of the STA, and EOSP field 910 represents the U-APSD Service Period status of the second band of the STA. In generally, when more data is available for out of band communication, the A-Control field sent over a first band will cause the STA to enter an awake state to send or receive the available data over a second band.

Figure 10:
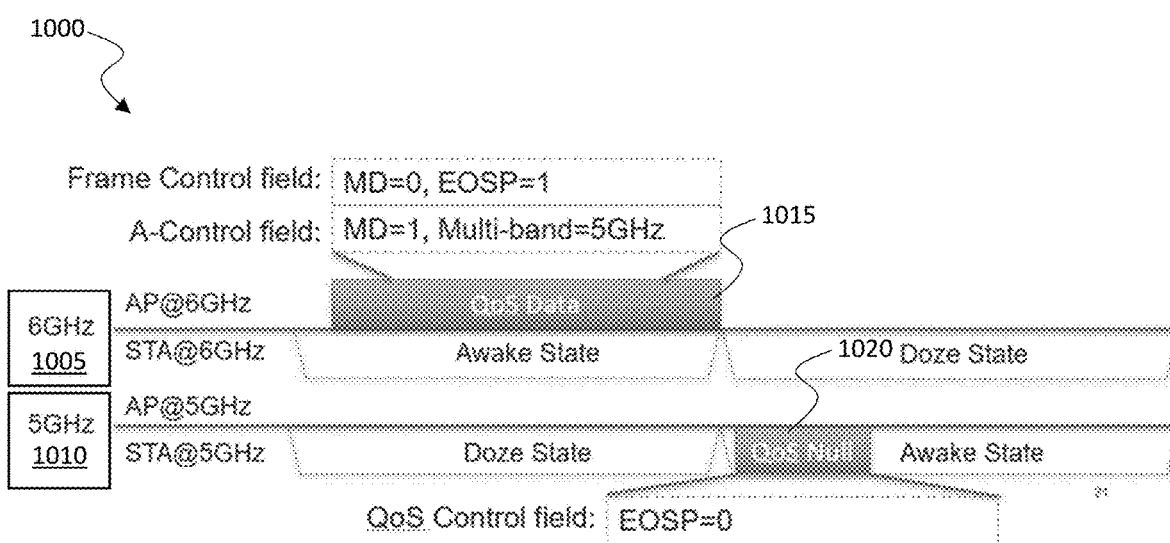
FIG. 10 is an exemplary transmission timing diagram depicting an AP and a non-AP STA operating using cooperative multi-band communication over a 6 GHz band and a 5 GHz band to control the STA awake state based on a More Data field according to embodiments of the present invention.

With regard to FIG. 10, an exemplary transmission timing diagram 1000 depicting an AP and non-AP STA operating using cooperative multi-band communication over a 6 GHz band 1005 and a 5 GHz band 1010 to control the STA awake state based on a More Data (MD) field is depicted according to embodiments of the present invention. A QoS Data frame 1015 sent over the 6 GHz by the AP indicates that there is no more buffered data for the STA in the 6 GHz band 1005, and indicates that there is more buffered data for the STA in the 5 GHz band 1010. Therefore, the STA moves to a power saving doze state for the 6 GHz band 1005 because there is no more buffered data in the 6 GHz band 1005, and the STA moves to an awake state for the 5 GHz band 1010 because the STA was notified that there is more buffered data in the 5 GHz band 1010.

Specifically, as depicted in FIG. 10, QoS Null frame 1020 includes a QoS Control field having an EOSP field indicating that the STA should enter an awake state for the corresponding 5 GHz band 1010. The QoS Data frame 1015 includes a Frame Control field having an EOSP field indicating that the STA should enter a doze state for the corresponding 6 GHz band 1005 because the MD field indicates that no more data is available (buffered) for the 6 GHz band 1005. The QoS Data frame 1015 also includes an A-Control field having a field indicating that more data is available in the 5 GHz band. Therefore, the corresponding QoS Null frame 1020 includes an EOSP field indicating that the STA should enter an awake state on the 5 GHz band 1010 because more data is available.

Figure 11A:
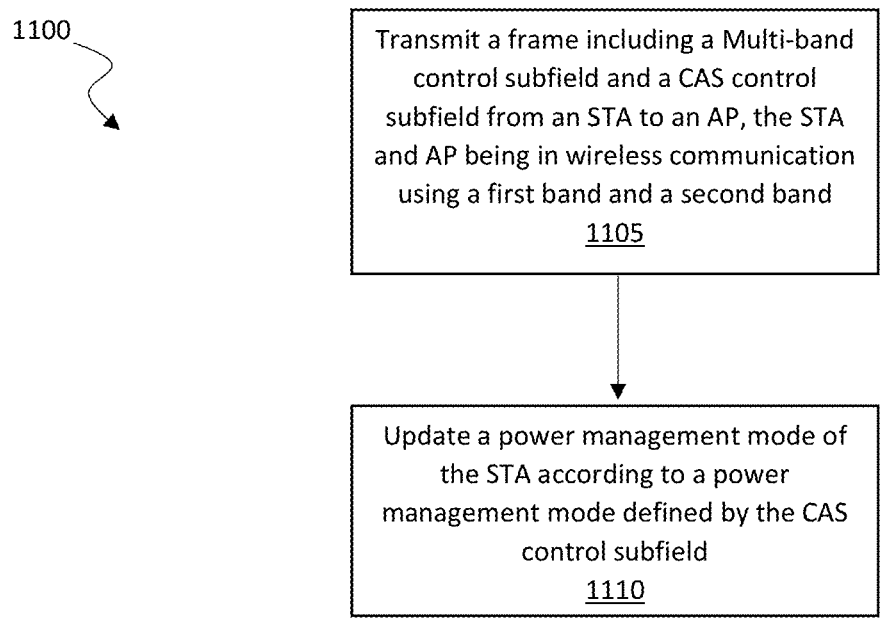
FIG. 11A is a flow chart depicting an exemplary sequence of computer implemented steps for controlling the power state or mode (e.g., active or doze) of a non-AP STA using an AP during cooperative multi-band operation according to embodiments of the present invention.

With regard to FIG. 11A, a flow chart of an exemplary sequence of computer-implemented steps 1100 for managing a power state of a wireless station (STA) for cooperative multi-band operation between the STA and a wireless access point (AP) is depicted for a wireless network according to embodiments of the present invention.

At step 1105, as depicted in FIG. 11A, the STA and the AP are in wireless communication using a first band and a second band. A frame is transmitted from the STA to the AP over the first band. The frame includes a Multi-band control subfield having a band indication of the second band, and a CAS control subfield comprising a power management mode for the second band.

At step 1110, a power management mode of the STA is updated for the second band according to the power management mode of the CAS control subfield.

Figure 11B:
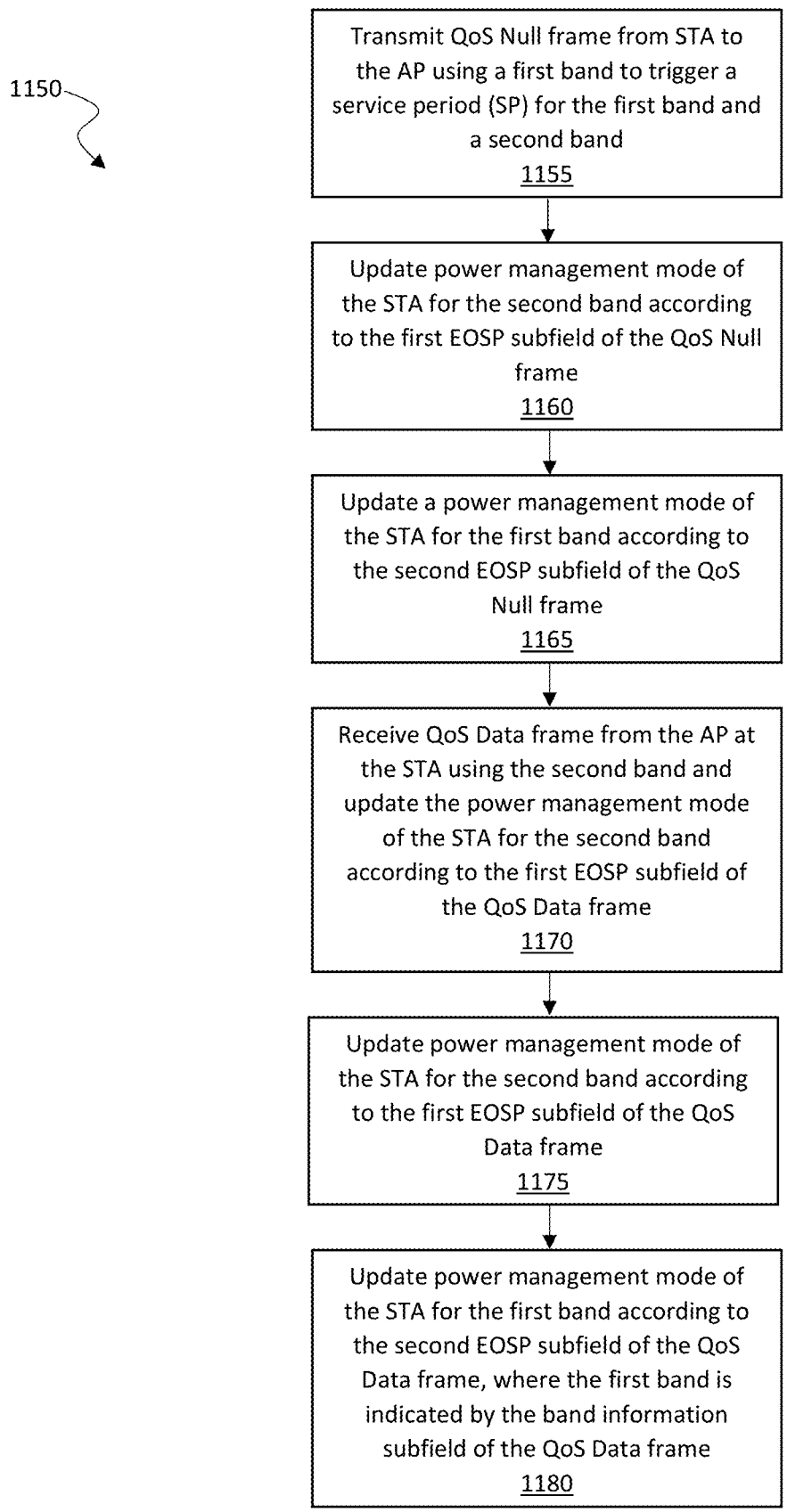
FIG. 11B is a flow chart depicting an exemplary sequence of computer implemented steps for controlling the power state or mode (e.g., active or doze) of a non-AP STA using QoS Null and QoS Data frames according to embodiments of the present invention.

With regard to FIG. 11B, a flow chart of an exemplary sequence of computer-implemented steps 1150 for managing a power state of a wireless station (STA) for cooperative multi-band operation using a QoS Null frame and a QoS Data frame depicted for a wireless network according to embodiments of the present invention.

At step 1155, as depicted in FIG. 11B, a QoS Null frame is transmitted from the STA to the AP using a first band, where the STA and the AP are in wireless communication using the first band and a second band. The QoS Null frame triggers a service period (SP) for the first band and the second band.

At step 1160, a power management mode of the STA is updated for the second band according to a first EOSP subfield of the QoS Null frame, where the second band is identified by a band information subfield of the QoS Null frame.

At step 1165, a power management mode of the STA is updated for the first band according to a second EOSP subfield of the QoS Null frame.

At step 1170, a QoS Data frame is received from the AP at the STA using the second band, and a power management mode of the STA is updated for the second band according to a first EOSP subfield of the QoS Data frame.

At step 1175, a power management mode of the STA is updated for the second band according to a first EOSP subfield of the QoS Data frame.

At step 1180, a power management mode of the STA is updated for the first band according to a second EOSP subfield of the QoS Data frame, where the first band is indicated by a band information subfield of the QoS Data frame.

Exemplary Computer Controlled System

Embodiments of the present invention are drawn to electronic systems for performing power management for cooperative multi-band operations in a wireless network. The following discussion describes one such exemplary electronic system or computer system can be used as a platform for implementing embodiments of the present invention.

Figure 12:
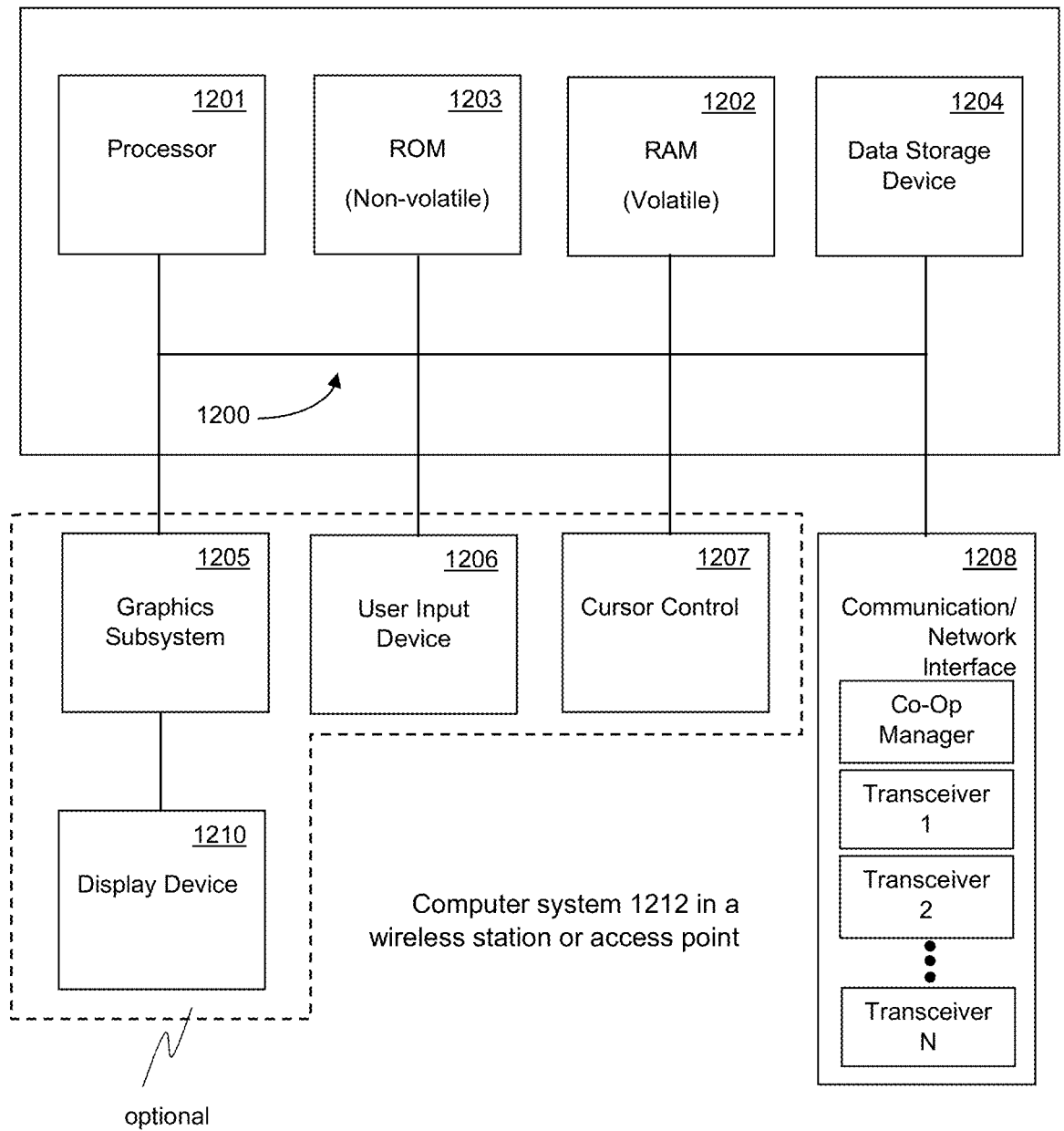
FIG. 12 is a block diagram of an exemplary computer system platform upon which embodiments of the present invention may be implemented.

In the example of FIG. 12, the exemplary computer system 1212 (e.g., a multi-band cooperative wireless access point AP or a multi-band cooperative wireless station STA) includes a central processing unit (CPU) 1201 for running software applications and optionally an operating system. Random access memory 1202 and read-only memory 1203 store applications and data for use by the CPU 1201. Data storage device 1204 provides non-volatile storage for applications and data and may include fixed disk drives, removable disk drives, flash memory devices, and CD-ROM, DVD-ROM or other optical storage devices. The optional user inputs 1206 and 1207 comprise devices that communicate inputs from one or more users to the computer system 612 (e.g., mice, joysticks, cameras, touch screens, and/or microphones).

A communication or network interface 1208 includes a plurality of transceivers and allows the computer system 1212 to communicate with other computer systems, networks, or devices via an electronic communications network, including wired and/or wireless communication and including an Intranet or the Internet (e.g., 802.11 wireless standard). The communication or network interface 1208 can operate multiple transceivers simultaneously e.g., Transceiver 1 and Transceiver 2. The communication or network interface 1208 can further include a cooperative management unit for coordinating the data sent and/or received by the transceivers. The communication or network interface 1208 and can include a dual band interface that can operate in multiple bands simultaneously, such as 2.4 GHz, 5 GHz, and/or 6 GHz. Power management operations are performed by an AP or non-AP STA to control the status (e.g., active or doze) of the non-AP STA over specific bands, for example, to conserve power.

The optional display device 1210 may be any device capable of displaying visual information in response to a signal from the computer system 1212 and may include a flat panel touch sensitive display, for example. The components of the computer system 1212, including the CPU 1201, memory 1202/1203, data storage 1204, user input devices 1206, and graphics subsystem 1205 may be coupled via one or more data buses 1200.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of managing a power state of a wireless station (STA) for cooperative multi-band operation between the STA and a wireless access point (AP) for a wireless network, the method comprising:
associating frames of a first traffic identifier (TID) with a first band according to a quality of service (QoS) policy of the AP;
associating frames of a second traffic identifier (TID) with a second band according to the QoS policy of the AP;
receiving a frame transmitted from the STA to the AP over the second band, said frame comprising an A-Control field comprising a field indicating a buffer status of the first band for transmitting frames of the first TID; and
updating a power management mode of the STA for the first band associated with the first TID according to the buffer status of the first band received from the STA over the second band associated with the second TID, wherein the frame further comprises another subfield indicating additional data is buffered on the second band.

2. The method as described in claim 1, wherein said first band and said second band respectively comprise at least one of: a 2.4 GHz band; a 5 GHz band; and a 6 GHz band.

3. The method as described in claim 1, further comprising accessing a traffic indication map (TIM) for the first band and the second band based on a respective traffic type associated with the first band and the second band and determining a buffer status of the first band and the second band according to the TIM.

4. The method as described in claim 3, wherein the TIM comprises a virtual bitmap of association IDs mapped to the first band and the second band based on traffic type.

5. A method of managing a power state of a wireless station (STA) for cooperative multi-band operation between the STA and a wireless access point (AP) for a wireless network, the method comprising:
performing a wireless transmission to transmit data from the STA to the AP over a first band;
receiving a QoS Null frame transmitted from the STA to the AP using the first band, wherein the STA and the AP are in wireless communication using the first band and a second band, and wherein the QoS Null frame triggers a service period (SP) for the first band and the second band;
pausing the first wireless transmission on the first band and updating a power management mode of the STA for the first band according to a subfield of a frame received by the STA from the AP; and
updating a power management mode of the STA for the second band according to a first subfield of the QoS Null frame received from the STA indicating that additional data is buffered on the second band, wherein the second band is identified by a band information subfield of the QoS Null frame, wherein the QoS Null frame further comprises a second subfield indicating additional data is buffered on the second band.

6. The method as described in claim 5, wherein the power management mode of the STA is updated for the first band wherein the STA is in an awake mode on the first band when more data is available on the first band, and wherein the power management mode of the STA is updated for the first band wherein the STA is in a doze mode on the first band when no more data is available on the first band.

7. A wireless access point (AP) for performing cooperative multi-band operation with a wireless station (STA) in a wireless network, the AP comprising:
a first transceiver configured to communicate over a first wireless band;
a second transceiver configured to communicate over a second wireless band, wherein the first transceiver and the second transceiver are operable to communicate simultaneously;
a cooperative management unit configured to exchange data with the first transceiver and the second transceiver for managing simultaneous communication of the first transceiver and the second transceiver; and a processor operable to:

receive a QoS Null frame transmitted from the STA using the first wireless band, and wherein the QoS Null frame triggers a service period (SP) for the first wireless band and the second wireless band;

pause the first wireless transmission on the first wireless band and updating a power management mode of the STA for the first wireless band according to a subfield of a frame received by the STA from the AP; and update a power management mode of the STA for the second wireless band according to a first subfield of the QoS Null frame received from the STA indicating that additional data is buffered on the second wireless band, wherein the second wireless band is identified by a band information subfield of the QoS Null frame, wherein the QoS Null frame further comprises a second subfield indicating additional data is buffered on the second wireless band.

8. The AP as described in claim 7, wherein said first wireless band and said second wireless band individually comprise at least one of a 2.4 GHz band, a 5 GHz band, and a 6 GHz band.

9. The AP as described in claim 7, wherein the processor is further operable to access a traffic indication map (TIM) for the first wireless band and the second wireless band based on a respective traffic type associated with the first wireless band and the second wireless band and determine a buffer status of the first wireless band and the second wireless band according to the TIM.

10. The AP as described in claim 9, wherein the TIM comprises a virtual bitmap of association IDs mapped to the first wireless band and the second wireless band based on traffic type.

* * * * *